United States Patent [19]

Annecke

[11] 4,423,493

[45] Dec. 27, 1983

[54] ELASTIC MEMORY WITH ARRANGEMENT FOR REDUCING PHASE FLUCTUATIONS IN THE OUTPUT CLOCK PULSE

[75] Inventor: Karl H. Annecke, Backnang, Fed. Rep. of Germany

[73] Assignee: Licentia Patent-Verwaltungs GmbH, Frankfurt am Main, Fed. Rep. of Germany

[21] Appl. No.: 390,892

[22] Filed: Jun. 22, 1982

[30] Foreign Application Priority Data

Jun. 23, 1981 [DE] Fed. Rep. of Germany ....... 3124516

[51] Int. Cl.³ .......................... G11C 7/00; G11C 8/00
[52] U.S. Cl. ..................................... 365/233; 365/189
[58] Field of Search ................................. 365/189, 233

[56] References Cited

U.S. PATENT DOCUMENTS

| | | | |
|---|---|---|---|
| 3,671,776 | 6/1972 | Houston | 365/233 |
| 4,151,609 | 4/1979 | Moss | 365/233 |
| 4,287,577 | 9/1981 | Deal | 365/233 |

FOREIGN PATENT DOCUMENTS 52-16121  2/1977  Japan .................................. 365/233

603136  3/1978  U.S.S.R. .............................. 365/233

OTHER PUBLICATIONS

CCITT Org. Book, vol. III-2, Sec. 7, 1977, pp. 447–450.
Weiss, "Digitaler Multiplexer Zweiter Ordnung DMX-8 von 8448 k Bit/s mit Positiver Stopftechnik," Hasler-Mitteilungen, 11/1/78, pp. 14–23.
TCM 2401, Preliminary Data Sheet, Texas Instruments, 1980, May 28.

Primary Examiner—Stuart N. Hecker
Attorney, Agent, or Firm—Spencer & Frank

[57] ABSTRACT

An arrangement for reducing phase fluctuations in the output or reading clock pulse of elastic memories which are produced during the absence and return of the external input clock pulse. According to the invention, the writing and reading clock pulses are replaced immediately upon the absence of the external input clock pulse by a clock pulse generated at the desired frequency for so that the minimum distance between the written-in memory cell and the read-out memory cell remains in effect even for the time of the operating malfunction and no additional regulating processes are required when the external input clock pulse re-appears.

3 Claims, 4 Drawing Figures

ELASTIC MEMORY WITH ARRANGEMENT FOR REDUCING PHASE FLUCTUATIONS IN THE OUTPUT CLOCK PULSE

BACKGROUND OF THE INVENTION

The present invention relates to an elastic memory, and more particularly to an arrangement for reducing phase fluctuations in the output clock pulses of elastic memories as they occur upon the temporary absence and the reappearance of the external input clock pulse.

Elastic memories are used in data transmission for the insertion of additional data (stuffing process), for the extraction of additional data (unstuffing process) or to convert a noncontinuous data flow into a data flow having a clock pulse frequency equal to the average clock pulse frequency of the noncontinuous data flow (dejittering).

An elastic memory can be realized in various ways, with one such way being e.g., with the aid of shift registers. (CCITT Org. Book Vol III-2 Section 7, 1977. Weiss, Digitaler Multiplexer zweiter Ordnung DMX-8 von 8448 kBit/s mit positiver Stopftechnik, Hasler Mitteilungen Nr. 1 1978 TCM 2401, preliminary data sheet, Texas Instruments, 1980)

FIGS. 1 and 2 show conventional input and output signals for an elastic memory, which signals are substantially independent of the internal structure of the elastic memory. As shown in FIGS. 1 and 2, the elastic memory 1, has a first input 2 for the clock pulses for writing in the data (writing or input clock pulse), a second input 3 for the data to be written in, and a third input 4 for the clock pulses for reading out the data (reading or output clock pulse). The elastic memory 1 is also provided with a first output 5 for the data read out, and a further output 6 for the control signal. The control signal at output 6 contains the information about the distance between the cell i in which data has just been written and the cell i+m from which data has just read out for an elastic memory 1 comprising a total of n cells. The distance or number of cells m between the just written-in cell i and the just read-out cell i+m bears the reference numeral 7, the written-in cell i has the reference numeral 8, and read-out cell i+m has the reference numeral 9. Finally, a voltage controlled oscillator 14 is provided between the control signal output 6 and the reading clock pulse input 4.

The reading clock pulses at input 4 advance the reading process clockwise from cell to cell away from the current cell 9 and the writing clock pulses at input 2 advance the writing process clockwise from cell to cell away from the current cell 8. The control signal at output 6 is used to control the reading clock pulse during a stuffing process and to control the reading clock pulse during a dejittering process in such a way that the distance 7 between the written-in and read-out cells does not fall below a certain minimum value and the average frequency of the reading clock pulses is equal to the average frequency of the writing clock pulses.

Usually, a voltage controlled oscillator VCO 14, operating at a frequency which is regulated in the described manner by the regulating signal at output 6, is used as the controllable reading clock pulse generator.

This arrangement encounters problems if an external input clock pulse signal is missing. Then either the writing clock pulses or the reading clock pulses or both clock pulses are omitted. In this case, a useful control signal at output 6 is no longer available. That means, that the distance 7 can take on any desired value between 0 and n. If now the external input clock pulses are switched in again, the full operation of the circuit is realized only after a long, complicated regulating process until the distance 7 of at least m cells has been re-established.

These problems are nowadays usually solved in that, if a clock pulse signal is missing, the control signal at output 6 is replaced by a desired value, and the renewed inclusion of the clock pulse signal is delayed until the distance between the read-out and the written-in cell is greater than the required minimum distance. The control of these processes requires additional, complicated logic elements.

SUMMARY OF THE INVENTION

It is the object of the present invention to provide an arrangement for reducing phase fluctuations in the output clock pulse of elastic memories with which it is possible to maintain, during the absence of an external input clock pulse, i.e. during an operating malfunction, the space between the written-in cell and the read-out cell so that if the external input clock pulse appears again, no additional regulating processes are required.

Moreover, the arrangement should be realizable in a simple manner. The above object is achieved according to the invention in that in an arrangement including: an elastic memory having a first input for the writing in of data, a first output for the reading out of data, a writing clock pulse input, a reading clock pulse input, and a further output for a control signal corresponding to the distance between the memory cell into which data are written in via said first input and the memory cell from which data are read out via said first output; a voltage controlled pulse generator means having its control input connected to the further output of the memory and its output connected to the reading clock pulse input of the memory with the generator means being responsive to the control voltage at the further output for generating the reading clock pulses; and a source of external clock pulses (with a first output) for normally supplying input clock pulses to the writing clock pulse input of the memory and a second output indicating a malfunction, especially the absence of clock pulses, at the first output of the said source of external clock pulses; a circuit arrangement is provided for reducing phase fluctuations in the reading clock pulses upon the absence and re-appearance of the correct external input clock pulses with this circuit arrangement comprising: means for causing clock pulses generated at a desired frequency fo to be applied to the writing and the reading clock pulse inputs during the time of malfunction or absence of the external input clock pulses, so that a desired minimum distance between the memory cell into which data are written in and the memory cell from which data are read out is maintained during the time of malfunction or absence of the external input clock pulse. A number of specific embodiments of the invention are described below.

DETAILED DESCRIPTION OF THE PREFERRED EMBODIMENTS

Figure 1:
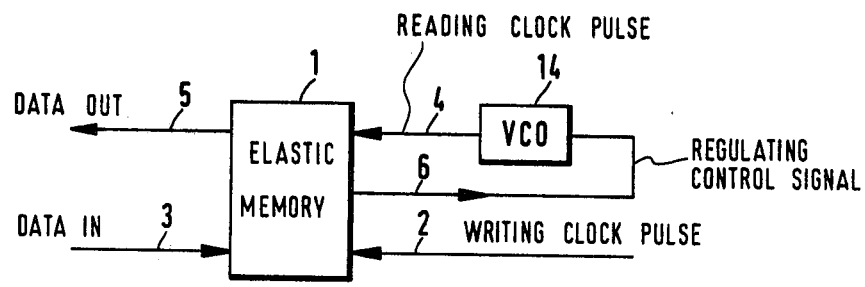
FIG. 1 is a block diagram of a basic elastic memory device showing the conventional inputs and outputs.
Figure 2:
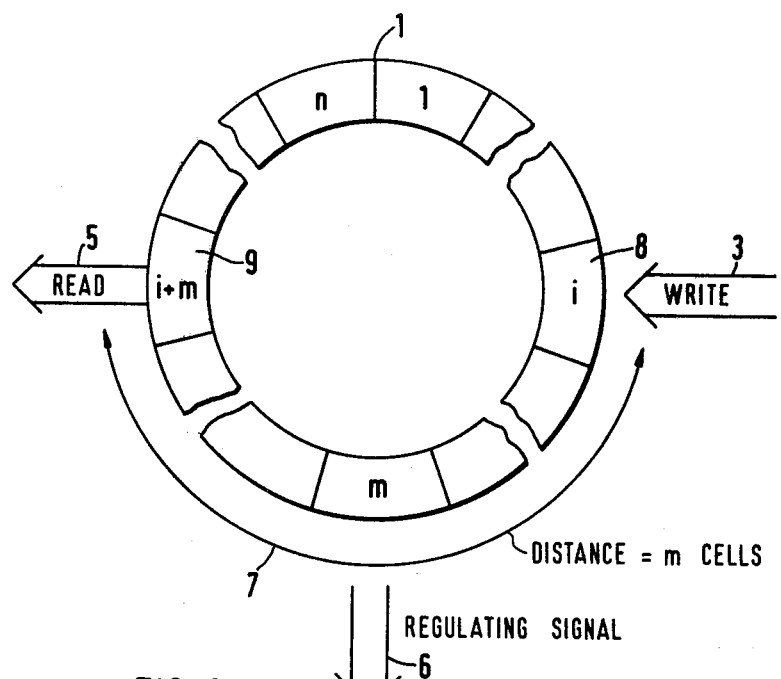
FIG. 2 is a schematic illustration of a basic elastic memory arrangement used in explaining the operation of same.
Figure 3:
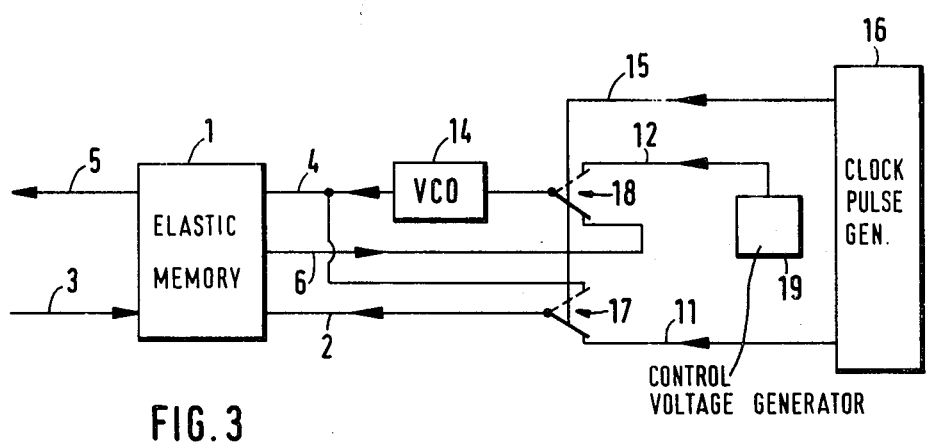
FIG. 3 is a block circuit arrangement according to one embodiment of the invention.

Referring now to FIG. 3, there is shown an elastic memory 1 with inputs and outputs 2-6 and a voltage controlled oscillator or clock pulse generator 14 as shown in FIG. 1. As further shown in FIG. 3, the write clock pulse input 2 is normally connected to the output 11 of a source of external input clock pulses 16 via a switch 17 which, when activated, disconnects the input 2 from the output 11 and connects the write clock pulse input 2 directly to the read clock pulse input 4, and consequently the output of the oscillator or generator 14. Contrary to the arrangement of FIG. 1, the input of the oscillator or generator 14 is connected to the control voltage output 6 via a switch 18. When activated, the switch 18 disconnects the input of the oscillator 14 from the output 6 and connects same to the output 12 of a control voltage generator 19 which produces a control voltage of a predetermined value which causes the oscillator to generate clock pulses at a desired frequency fo. The activation of both switches 17 and 18 is controlled by a switching signal 15 produced by the clock pulse generator 16 which indicates the absence or malfunction of clock pulses at the output 11 from the external clock pulse generator 16. Although the switches 17 and 18 have been shown as mechanical switches, this is by way of illustration only and it is understood that conventional electronic switching arrangements are preferably used in the actual embodiments.

In the operation of the embodiment of FIG. 3, a switching signal 15 generated by the circuit 16 when the external clock pulse show a malfunction at output 11 causes the switches 17 and 18 to be simultaneously activated so as to replace the regulating signal at output 6 by a desired value at output 12 and to connect the writing clock pulse input 2 directly with the reading clock pulse input 4. Thus identical clock pulses at a frequency fo are being supplied to both inputs 2 and 4.

Figure 4:
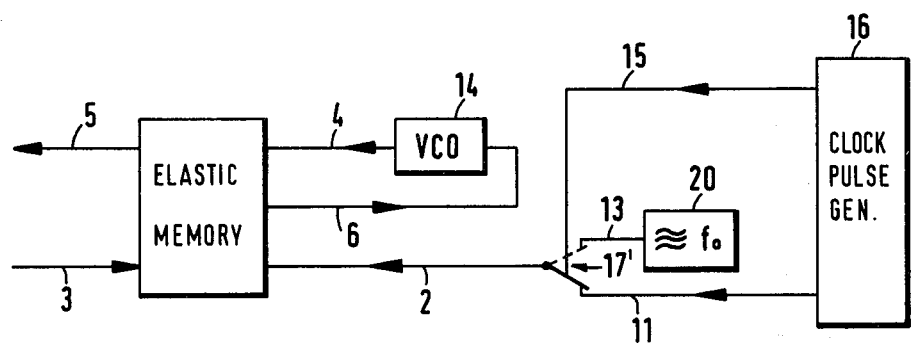
FIG. 4 is a block circuit arrangement according to a further embodiment of the invention.

According to the alternative embodiment of FIG. 4, the arrangement of FIG. 1 is modified in that the write clock pulse input 2 is normally connected with the output 11 of the source of external input clock pulses 16 via a switch 17' which when activated disconnects the input 2 from the output 11 and connects input 2 to the output 13 of an auxiliary clock pulse generator or oscillator 20 running at the desired clock pulse frequency fo. As in FIG. 3, the switch 17' is controlled by a switching signal 15 produced by the circuit 16 in the absence or malfunction of the clock pulse signal at the output 11.

In the operation of the embodiment of FIG. 4, upon the detection of the missing external input clock pulse at the output 11, the input 2 is switched, by means of the switch 17' and a switching signal 15 from the circuit 16, to the output 13 of the auxiliary clock pulse oscillator 20 running at the desired frequency fo. Due to the resulting regulating signal at output 6, the voltage controlled oscillator (VCO) 14, which furnishes the reading clock pulse to input 4, then also runs at the desired frequency fo.

In both embodiments it is assured that the distance 7 between the written-in cell and the read-out cell 9 does not fail below the minimum distance and that the average reading and writing clock pulse frequencies are identical.

Therefore, if the external writing clock pulse 11 from source 16 again appears at output 11, and the switches 17 and 18 or 17' are again returned to their respective normal conditions, the only control processes required are those to equalize the maximum time offset of ±0.5 clock pulses. Regulating processes of this type also occur during uninterfered with operation of an elastic memory, and hence cause no problem.

Thus it is possible with the above-described arrangement to provide clock pulse switching in elastic memories with a minimum of regulating procedures and without much expense.

It will be understood that the above description of the present invention is susceptible to various modifications, changes and adaptations, and the same are intended to be comprehended within the meaning and range of equivalents of the appended claims.

What is claimed is:

1. In combination with an elastic memory including a first input for the writing in of data, a first output for the reading out of data, a writing clock pulse input, a reading clock pulse input, and a further output for a control signal corresponding to the distance between the memory cell into which data are written in via said first input and the memory cell from which data are read out via said first output, a voltage controlled pulse generator means having its control input connected to said further output and its output connected to said reading clock pulse input, said generator means being responsive to said control voltage at said further output for generating said reading clock pulses, and a source of external clock pulses for normally supplying input clock pulses to said writing clock pulse input and supplying a signal which indicates a malfunction or absence of the said external clock pulses; an arrangement for reducing phase fluctuations in the reading clock pulses upon the malfunction or absence and re-appearance of said external input clock pulse comprising: means for causing a clock pulse generated at a desired frequency fo to be applied to said writing and said reading clock pulse inputs during the time of absence or malfunction of said external input clock pulses, so that a desired minimum distance between said memory cell into which data are written in and said memory cell from which data are read out is maintained during the time of absence or malfunction of said external input clock pulse.

2. The apparatus defined in claim 1 wherein said means for causing comprises: switching means, responsive to the said malfunction or absence indicating signal, for disconnecting said input of said pulse generator means from said further output and for re-connecting same to a source of control voltage which causes said generator means to produce clock pulses of said frequency fo, and for disconnecting said writing clock pulse input from said source of external input clock pulses and for re-connecting same to said output of said generator means.

3. The apparatus defined in claim 1 wherein said means for causing comprises switching means, responsive to the said malfunction or absence indicating signal, for disconnecting said writing clock pulse input from said source of external input clock pulses and for re-connecting same to the output of a clock pulse generator which produces clock pulses at said frequency fo, whereby said control voltage causes said clock pulse generator means to likewise produce reading clock pulses at said desired frequency fo.

* * * * *